Aug. 14, 1951     L. V. MALLORY     2,564,541
HOISTING AND STRETCHING APPARATUS
Filed Sept. 20, 1946
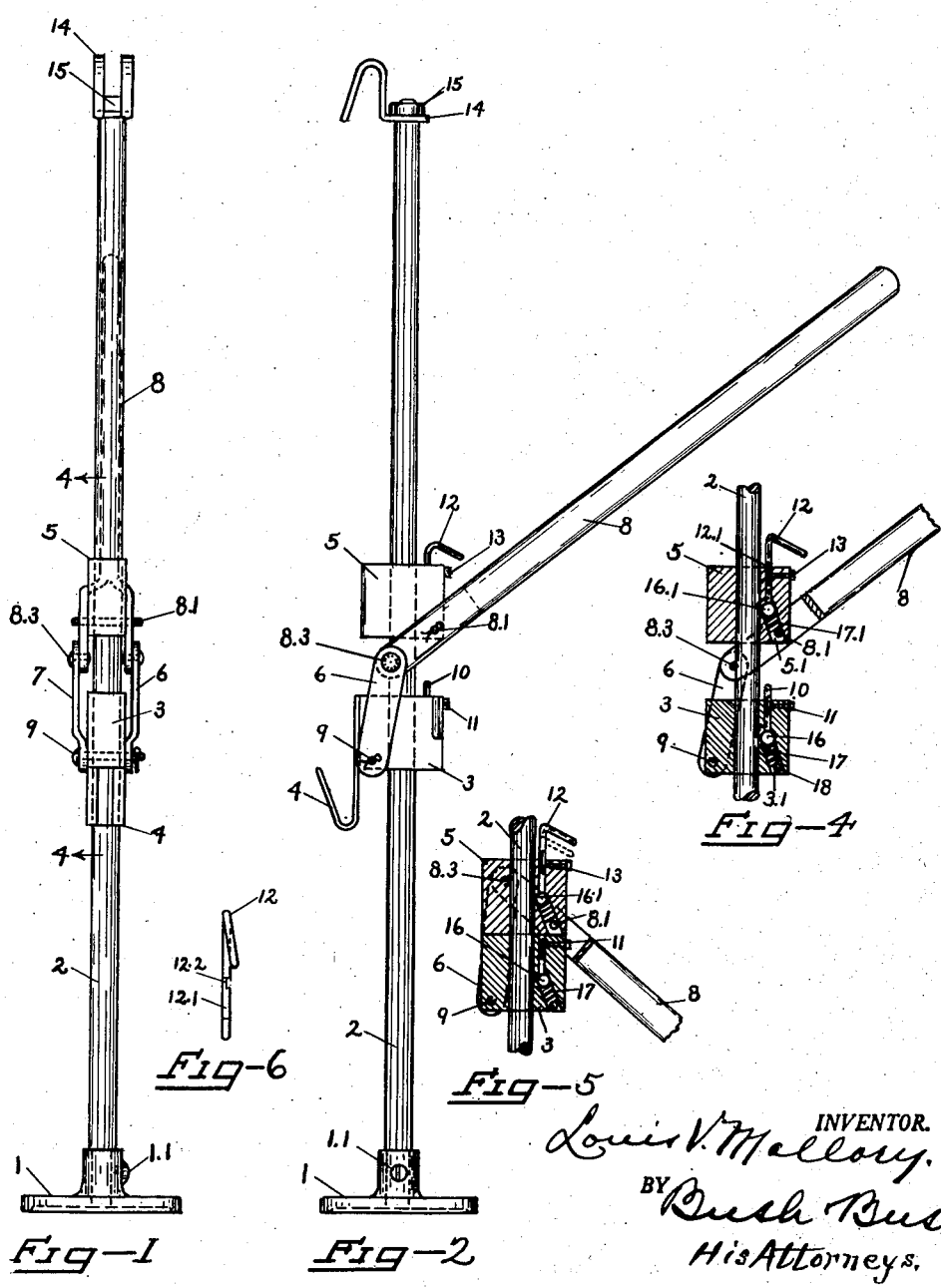

Patented Aug. 14, 1951

2,564,541

UNITED STATES PATENT OFFICE 2,564,541

HOISTING AND STRETCHING APPARATUS

Louis V. Mallory, Rock Island, Ill., assignor of one-fourth to Carl E. Granum, Rock Island, Ill., and one-fourth to Ivan D. Lemley, Davenport, Iowa Application September 20, 1946, Serial No. 698,302

4 Claims. (Cl. 254—69)

My invention relates to improvements in apparatus for hoisting heavy weights and stretching wires such as barbed wire, telephone wires, etc., and the objects of my invention are to provide a simplified apparatus available for use as a hoisting jack for automobiles or other heavy objects and for stretching barbed wire; to provide improved apparatus for lowering a jack or for releasing the tension upon barbed wire or similar lines; to provide improved gripping means by which one block may be held stationary while an adjoining block is drawn toward or way from it. Other objects will appear from the description.

I accomplish these objects by the means illustrated in the accompanying drawings, in which:

Figure 1 is a front elevation;

Figure 2 is a side elevation;

Figure 3 is a plan view;

Figure 4 is a sectional detail on the line 4—4 of Figure 1;

Figure 5 is a similar sectional detail but showing the handle down and the blocks in contact;

Figure 6 is an enlarged detail of the pin 12.

Similar numerals refer to similar parts throughout the several views.

My apparatus comprises a rod or bar 2 and when used as an automobile jack, a foot 1 is united to the lower end of the rod 2 to act as a base. At the opposite end of the rod a hook 14 is mounted adapted to engage the upper part of the automobile bumper or other object and may be secured in place by a nut 15.

Upon the body of the rod a pair of blocks 3 and 5 are slidably mounted. The block 3 carries a hook or arm 4 united thereto in front of the rod. The rear of the block 3 has a diagonal bore 3.1 formed therein inclining obliquely inward and forward from the lower end of the block.

A steel ball 16 is mounted in the bore 3.1 and is pressed upwardly by a helical spring 17 seated in the bore. The spring 17 may be held in place by a seat screw 18 or other suitable means. When the ball 16 is at or close to the top of the bore, it bears both against the rod 2 and the block 3.

A pin 10 is slidably mounted in the bore and retained in place by a set screw 11. The inner end of the set screw protrudes into an elongated notch or cut in one side of the pin 10 and acts to retain the pin against displacement while permitting longitudinal movement of the pin.

The inner end of the pin 10 is arranged to bear against the ball 16 and when the pin is depressed, the ball is pushed downwardly in the bore and the oblique angle of the bore carries the ball out of contact with the rod 2 so that the block 3 is readily slidable upon the rod 2.

When the pin 10 is raised, the helical spring 17 pushes the ball 16 upwardly into contact with the rod and the block and the ball thus locks the rod and block together.

A similar block 5 is mounted upon the rod spaced at a predetermined distance from the block 3. The block 5 is provided with a corresponding bore 5—1, spring 17—1 and ball 16—1, and the bore is inclined forwardly as it goes up.

A pin 12 is mounted in the block 5 and the inner end of the pin is arranged to contact the ball 16—1. The pin 12 is notched or cut away at 12—1 and secured in place by a set screw 13.

The outer end of the pin 12 is preferably bent at an angle to the body of the pin or formed into a hook for convenient manual adjustment.

The balls are preferably made of hard steel or similar material and the rods are somewhat softer metal to more readily accomplish the locking effect.

The pin 12 has a longitudinal notch or cut 12—1 in one side thereof into which the set screw 13 protrudes. The upper end of this notch has a short lateral notch 12—2 connecting therewith so arranged that by rotating the pin, the set screw will enter the lateral notch 12—2 and hold the pin in engagement with the ball 16—1, thus securing the ball out of engagement with the rod and permitting the block 5 to slide freely upon the rod.

A manually operable lever 8 is pivotally mounted upon the block 5 by a shaft or pin 8—1 which may be secured by a cotter pin 8—2 or other suitable means and the front end of the lever is connected to the lower block 3 by links 6 and 7. The lower ends of the links 6 and 7 are pivotally united to the block 3 by a pivot 9 and the other ends are pivotally united to the lever 8 by pivots 8—3.

In the operation of my apparatus as a jack, the rod is placed in vertical position standing upon its base 1 and the block 3 is moved upwardly until the hook or arm 4 engages the lower edge of the bumper or other object to be hoisted, the handle or lever 8 being extended horizontally. The handle is then raised to its highest allowable position, thus raising the block 5. The handle then being lowered, the links 6 and 7 will raise the block 3 carrying the load with it, while the block 5 remains stationary.

When the block 3 has been raised to its predetermined limit, the pin 10 contacts the block 5 or pin 8—1 in the bore of the block 5 thus forcing the pin 10 downwardly against the ball 16 and releasing the block 3 from the rod 2, so that the block 3 may descend a short distance equal to the limited travel of the pin 10 and the spring 17 will then return the ball 16 into contact with the rod and the block 3, the block 3 being held against any further downward movement by the links 6 and 7 and the block 5 being secured against downward movement by the ball 16—1.

The handle of the lever 8 will then be raised again thus raising the block 5. As soon as the blocks 3 and 5 are separated a distance equal to the allowable travel of the pin 10, the spring 17 will return the ball 16 into contact with the rod 2 and the block 3 will be prevented from any further downward movement, thus forcing the block 5 to move upwardly. This operation can then be repeated until the blocks 3 and 5 have been raised to their extreme allowable height.

In order to reset the jack and allow the blocks 3 and 5 and lever 8 to descend, the pin 12 is provided with a terminal lateral notch 12—2 into which the set screw 13 may enter when the pin 12 is rotated in the right direction and the pin will then hold the ball 16—1 out of engagement with the rod 2 thus allowing both blocks to be moved freely along the rod 2 if the blocks are first put in contact with each other so that the pin 10 will release the ball 16 from the rod.

If desired, the jack can be lowered by reciprocating movement of the handle after the pin 12 has been placed in locked position to release the ball 16—1 from the rod 2, for as the block 5 is carried downwardly by the lever 8 into contact with the block 3, the pin 10 will be depressed and will release the ball 16 from the rod 2 and allow the block 3 to descend a distance equal to the travel of the pin 10, but as soon as the block 3 has descended that distance, the pin 10 will be released and the spring 17 will move the ball 16 upwardly and allow it to again engage the rod 2. This operation can be repeated until the blocks have been lowered to the desired level.

In order to make this apparatus available for use as a wire stretcher, the hook 14 is slotted as shown in Figure 1 and the hook 4 has a central slot therein parallel to the rod 2. These slots are of sufficient width to permit the entrance of a wire or wires as commonly used in barbed wire fencing and narrow enough to engage the barbs so as to hold same securely.

The apparatus described may be used for stretching two reaches of wire for the purpose of bringing the ends together so that they may be united. When so used, one wire will be placed in the slot of the hook 14 near the end of the wire and with the hook bearing against one of the barbs. The other wire will be similarly engaged with the hook 4. By operating the lever 8, the hooks may be made to approach each other bringing the ends of the wire into an overlapping position where they may be twisted together to form a union of any desirable form.

In case a single reach of wire is to be stretched, one of the hooks may be attached to the barbed wire already fastened to the fence post a short distance from the last post. The other hook may then be applied to the end of the wire or near the end of the wire to be stretched and as the hooks are made to approach each other by the action of the lever 8, the end of the wire being stretched may be brought into juxtaposition with the post just mentioned and secured thereto by stapling in the ordinary way. If desired, either one of the hooks may be secured to a post by a chain or other suitable means and the other hook may be applied to the wire to be stretched and brought up to the post.

While I have shown hooks adapted to engage a barbed wire, it is obvious that any other form of wire-gripping device may be used in place of the hooks shown and the apparatus will operate as described. So any form of arm 4 may be utilized as needed.

Various modifications may be made in the size, proportion and arrangement of the parts without departing from the spirit of my invention and I do not limit my claims to the precise forms shown.

I claim:

1. A hoisting and stretching apparatus comprising a rod, a pair of blocks slidably mounted upon the rod, the first block being provided with an arm to engage the object to be operated upon, a bore extending inwardly and forwardly from the outer end of said first block, a hard metal ball seated within the bore, a helical spring secured in the bore bearing against the ball and exerting pressure inwardly thereon to force the ball into contact with the rod, a pin slidably mounted in the first block with its inner end arranged to engage the ball and hold same out of engagement with the rod when the pin is depressed, the second block being provided with a similar bore having a hardened ball slidably mounted therein, a helical spring secured in the bore of the second block by a transverse pin and with the inner end of the spring bearing against the ball to normally hold the ball in engagement with the rod, a pin slidably mounted in said second block with its inner end arranged to contact said ball, each of the aforesaid pins being slidably mounted in their respective blocks and each having a longitudinal notch cut therein, adjustable set screws seated in said blocks respectively with their inner ends extending into the longitudinal notches in said slidable pins respectively and arranged to permit a limited travel of said pins and to act as a stop therefor at the end of such travel in either direction, the notch in said pin of the second block having a lateral extension near the outer end thereof and the pin in said block being rotatable so that the adjacent set screw may enter such extension and thereby lock the slidable pin in its innermost position, said pin in the second block also being provided with an arm formed upon its outer end for convenience in turning or moving it longitudinally, and a manually operable lever fulcrumed near one end thereof upon the second block, links having one end pivotally united to the shorter arm of the manually operable lever and their other ends pivotally united to the first block, and with the longer arm of said lever extending outwardly.

2. A hoisting and stretching apparatus as described in claim 1, and a hook united to the rod beyond the second block, the hooks having slots to receive and engage a barbed wire.

3. A hoisting jack comprising a base with a rod seated therein, upper and lower blocks slidably mounted upon the rod, the lower block being provided with an arm to engage the object to be lifted and having a bore extending upwardly and forwardly to the rod from the lower edge of said block, a hard metal ball seated within the bore, a spring secured in the bore bearing against the ball and exerting pressure inwardly thereon to force the ball into contact with the rod, a pin slidably mounted in said lower block with its inner end arranged to engage the ball opposite said spring and hold the ball out of engagement with the rod when the pin is depressed, a similar bore formed in the upper block having a hardened ball slidably mounted therein, a spring secured in the upper block bearing against said ball to normally hold the ball in engagement with the rod, a pin slidably mounted in the upper block with its inner end arranged to contact said ball opposite the last mentioned spring, elongated notches cut in said pins respectively, set screws mounted in said blocks respectively with their inner ends extending into the aforesaid notches and arranged to permit a limited travel of said pins and to form stops to arrest such travel in either direction, a lateral notch connecting with the longitudinal notch in the pin in the upper block and arranged to engage the inner end of the set screw therein when said pin is rotated so as to hold said pin in its innermost position, said pin being also provided with an arm by which it can be turned manually into or out of such set position, and a manually operable lever fulcrumed near one end thereof upon the second block, links having one end pivotally united to the shorter arm of the manually operable lever and their other ends pivotally united to the first block, and with the longer arm of said lever extending outwardly.

4. In a hoisting jack, the combination with a base, of a rod seated therein, upper and lower blocks slidably mounted upon the rod, the lower block being provided with an arm to engage the object to be lifted and having a bore extending upwardly and forwardly to the rod from the lower edge of said block, a hard metal ball seated within the bore, a spring secured in the bore bearing against the ball and exerting pressure inwardly thereon to force the ball into contact with the rod, a pin slidably mounted in said lower block with its inner end arranged to engage the ball opposite said spring and hold the ball out of engagement with the rod when the pin is depressed, a similar bore formed in the upper block having a hardened ball slidably mounted therein, a spring secured in the upper block bearing against said ball to normally hold the ball in engagement with the rod, a pin slidably mounted in the upper block with its inner end arranged to contact said ball opposite the last mentioned spring, elongated notches cut in said pins respectively, set screws mounted in said blocks respectively with their inner ends extending into the aforesaid notches and arranged to permit a limited travel of said pins and to form stops to arrest such travel in either direction, a lateral notch connecting with the longitudinal notch in the pin in the upper block and arranged to engage the inner end of the set screw therein when said pin is rotated so as to hold said pin in its innermost position, said pin being also provided with an arm by which it can be turned manually into or out of such set position, and a manually operable lever fulcrumed near one end thereof upon the upper block, links having one end pivoted to the inner end of said manually operable lever and their other ends pivotally united to the lower block, the opposite end of the operable lever extending outwardly for convenient manual operation.

LOUIS V. MALLORY.

REFERENCES CITED

The following references are of record in the file of this patent:

UNITED STATES PATENTS

| Number | Name | Date |
| --- | --- | --- |
| 383,709 | Crecelius | May 29, 1888 |
| 589,701 | Cox | Sept. 7, 1897 |
| 823,149 | White | June 12, 1906 |
| 851,313 | Pearson | Apr. 23, 1907 |
| 1,114,832 | Whitney | Oct. 27, 1914 |
| 1,754,132 | Van Bekkeim | Apr. 8, 1920 |